United States Patent [19]

Benson et al.

[11] 4,267,814

[45] May 19, 1981

[54] ABRASIVE SAW BLADE FOR TRAPEZOIDAL GROOVING

[75] Inventors: Donald H. Benson, Spencerport, N.Y.; Larry Mosher, Lebanon, Tenn.

[73] Assignee: Federal-Mogul Corporation, Detroit, Mich.

[21] Appl. No.: 101,045

[22] Filed: Dec. 6, 1979

[51] Int. Cl.³ .............................................. B28D 1/04
[52] U.S. Cl. .................................. 125/15; 51/206 R
[58] Field of Search ............... 51/206 R; 125/15; 407/118

[56] References Cited

U.S. PATENT DOCUMENTS

| | | | |
|---|---|---|---|
| 2,032,395 | 3/1936 | Bley | 51/206 R |
| 2,181,850 | 1/1958 | Schwarzkopf . | |
| 2,720,229 | 10/1955 | Drake . | |
| 3,128,755 | 4/1964 | Benson | 125/15 |
| 3,203,774 | 8/1965 | Pratt . | |
| 3,216,854 | 11/1965 | Halverstadt | 51/206 R |
| 3,221,728 | 12/1965 | Lindblad | 125/15 |
| 3,221,728 | 12/1965 | Lindblad . | |
| 3,576,061 | 4/1971 | Pahlitzsch | 21/105 |
| 4,072,437 | 2/1978 | Smith | 407/118 |

*Primary Examiner*—Harold D. Whitehead
*Attorney, Agent, or Firm*—William G. Coon

[57] ABSTRACT

A saw blade for producing a trapezoidal shaped groove in a surface including a circular support disc and a plurality of spaced-apart abrasive elements supported about the periphery of the support disc wherein the abrasive elements include a first set of a generally rectangular cross sectional configuration and a second set of a generally trapezoidal cross sectional configuration wherein the use of the two sets of abrasive elements extends the wear life of the saw blade.

13 Claims, 4 Drawing Figures

ABRASIVE SAW BLADE FOR TRAPEZOIDAL GROOVING

FIELD OF INVENTION

This invention relates to an abrasive type saw blade for trapezoidal grooving of surfaces. More specifically, this invention relates to an abrasive type saw blade having abrasive elements of at least two different configurations which significantly extend the useful life of the saw blade.

BACKGROUND OF THE INVENTION

In recent years, it has become accepted practice to groove the surface of highways and airport runways. The primary purpose of the grooves is to drain water from the surface to prevent aquaplaning of vehicles traveling over the surface.

If the surface is made of a rigid material, such as concrete, it is satisfactory to cut grooves in the surface which have a generally rectangular transverse cross section. However, it has been found that rectangular grooves are not as satisfactory for surfaces made of a relatively pliable or deformable material, such as asphaltic concrete, because the grooves tend to close under traffic. Once closed, the grooves are no longer effective for draining water from the surface. As a result, it has been common practice to specify grooves having a regular trapezoidal cross section; that is, a groove with a flat bottom wall and outwardly and upwardly diverging side walls. The cross sectional shape of the groove may also be described as an inverted truncated triangle.

The surface grooves are formed or cut with a grooving machine which drives gangs of abrasive cutting blades. The cutting blades generally include a circular metal core, or support disc, and a peripheral abrasive element which is normally made of a diamond abrasive material. The diamond abrasive material consists essentially of diamond particles distributed in a metal-base matrix and may comprise any of a number of standard and well known compositions.

Heretofore, the abrasive element for trapezoidal grooving consisted of a continuous rim, or edge around the periphery of the metal core. The abrasive element generally includes a transverse cross sectional configuration identical to the shape of the groove to be formed, that is, a generally regular trapezoidal shape with a rectangular base. In use, wear causes the configuration of the abrasive to change. Eventually, the configuration of the abrasive element approaches a rectangular shape. When this occurs the abrasive element is no longer capable of forming a groove having the desired configuration and the blade must be replaced. Since diamond abrasive blades are quite expensive, the wear life of the blades is an important consideration.

BRIEF SUMMARY OF THE INVENTION

The invention disclosed herein provides an abrasive type saw blade having a significantly increased wear life. This is accomplished by providing a discontinuous abrasive edge, or rim, around the periphery of the metal core comprising a plurality of abrasive elements having at least two different transverse cross sectional configurations. One set of abrasive elements has a generally rectangular transverse cross section while the other set of abrasive elements has a working portion having a generally trapezoidal, or truncated-trianglar, transverse cross section. The width of the rectangular abrasive element is substantially smaller than the width of the trapezoidal abrasive elements so that only the outer edges of the rectangular abrasive elements serve as working surfaces. The outer edges of the rectangular abrasive, as well as the outer edges of the trazpezoidal abrasive elements, remove material in a that generally horizontal plane and ultimately form the bottom wall, or floor, of the groove. The angled, or sloped, sides of the trapezoidal abrasive elements serve as working surfaces to form the side walls of the groove. The addition of the rectangular abrasive elements protects the trapezoidal abrasive elements from excessive wear so that a groove with the proper sloped wall configuration can be formed for a longer period of time.

PRIOR ART STATEMENT

Abrasive saw blades, or cut off discs, having a discontinuous abrasive rim are shown, for example, in U.S. Pat. Nos. 3,221,728; 3,203,774; and 2,818,850. Saw blades having teeth of different configurations are shown, for example, in U.S. Pat. Nos. 4,072,437; 3,576,061; and 2,720,229.

DETAILED DESCRIPTION OF A PREFERRED EMBODIMENT

Figure 1:
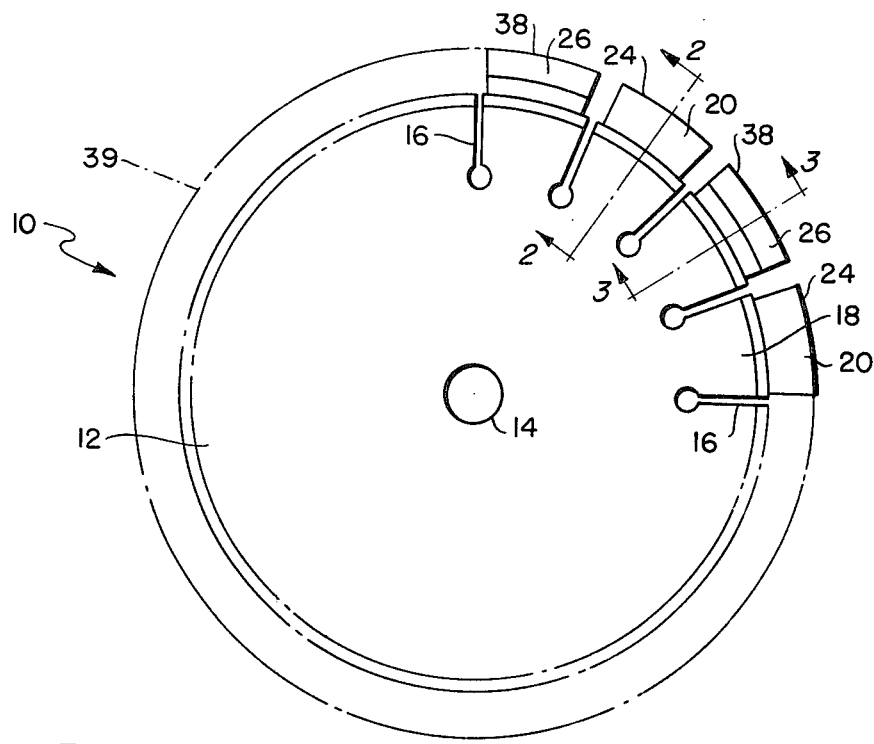
FIG. 1 is a front elevational view, partially in phantom, of an abrasive type saw blade constructed in accordance with the invention.

With reference to the drawings, and specifically FIG. 1, an abrasive saw blade constructed in accordance with the instant invention is generally shown at 10. The saw blade includes a circular metal core or support disc 12 having a hole 14 in the center thereof for mounting the saw blade 10 on a mandrel (not shown) or other drive member. The outer periphery of the metal core 12 is divided by a plurality of radially inwardly extending slots 16. The slots 16 divide the plurality of the metal core 12 into a number of equally sized arcuate sections 18 each of which is adapted to receive an abrasive element. The use of the slots 16 is conventional in the manufacture of abrasive cutting saws and such slots primarily serve the purpose of reducing thermally induced warpage during the manufacturing process.

Figure 2:
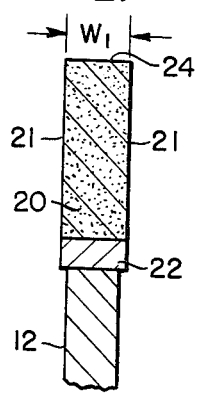
FIG. 2 if a cross sectional view taken generally along line 2—2 of FIG. 1.

An abrasive element is attached, as by welding to each of the arcuate sections 18 around the periphery of the metal core 12. The abrasive elements include a first set of abrasive element 20 having a generally rectangular cross section as best shown in FIG. 2. The rectangular abrasive element 20 includes generally parallel sides 21 as viewed in transverse cross section and a free end surface 24. The width ($w_1$) of the end surface 24 is substantially smaller than the thickness, or length, of the sides. The abrasive element 20 comprises a mixture of abrasive particles, such as diamond particles, bound together in a matrix of sintered powder metal. This abrasive element is made according to conventional techniques. A preferred manufacturing technique involves bonding the abrasive element 20 to an arcuate steel back 22. The steel back 22 is attached to the outer peripheral edge of the metal support disc 12 by means of welding or brazing. As will be more thoroughly described herein the outer peripheral edge or surface 24 of the rectangular abrasive element 20 constitutes its working surface.

Figure 3:
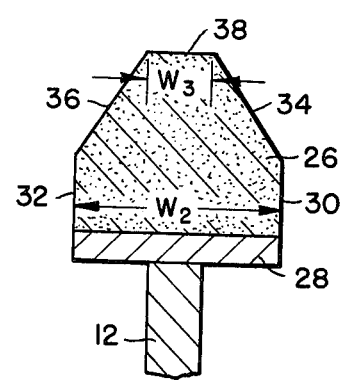
FIG. 3 is a cross sectional view taken generally along line 3—3 of FIG. 1.

The abrasive saw blade also includes a second set of abrasive elements 26 having a generally trapezoidal, or truncated triangular, working portion as best shown in FIG. 3. The abrasive element 26 is also bonded to a arcuate steel back 28 which is attached by welding or brazing to the support disc 12. As shown in FIG. 3, the abrasive element 26 includes a generally rectangular base having parallel side walls 30 and 32 and a width ($w_2$). Integrally formed with the base is a trapezoidal, or truncated triangular, working portion having angled or sloped side walls 34 and 36. The abrasive element 26 terminates in a flat edge or surface 38 which joins the sloping side walls 34 and 36. The width ($w_3$) of the end surface 38 is less than the width ($w_2$) and is approximately equal to the width ($w_1$) of the end surface 24 of the rectangular abrasive elements 20.

As shown in FIG. 1, the rectangular abrasive elements and the trapezoidal elements 26 are arranged in alternating order around the peripheral of the support disc 12. While this produces a one to one ratio between the two different types of abrasive elements, other ratios may be employed depending upon the type of abrasive material used and the composition of the surface being grooved. As is further shown in FIG. 1 the outer edges or surfaces 24 and 38 all lie on a common radius measured from the center of the support disc 12. In other words, the outer edges or surfaces 24 and 38 define a cylindrical plane as shown by the broken line 39.

Figure 4:
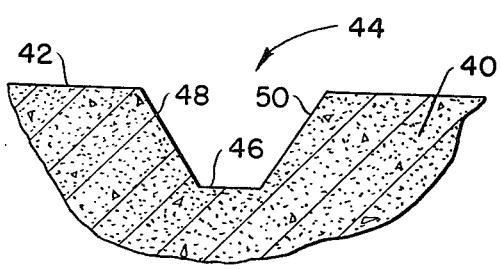
FIG. 4 is a transverse cross sectional view of the groove configuration formed with the abrasive saw blade of the invention.

The abrasive saw is employed to form a groove having the configuration generally shown in FIG. 4. More specifically, FIG. 4 shows a section of paving material 40, such as asphaltic concrete, having a load-carrying surface 42. A plurality of parallel grooves having the general configuration shown at 44 are cut in the surface to drain water from the surface. Groove 44 includes a bottom surface, or floor, 46 which for example, may have a width of approximately 0.125 inches. The side walls 48 and 50 extend upwardly and outwardly to form an opening having, for example, a width of 0.375 inches.

In use, the outer surface 24 of the rectangular elements 20 and the outer surfaces 38 of the trapezoidal elements 26 work in a horizontal plane parallel to the surface 42. As the paving material is abraded by the saw, these surfaces 24 and 38 eventually form the bottom wall or floor 46 of the groove. The side walls 48 and 50 of the groove are formed exclusively by the angled, or sloping, surfaces 34 and 36 of the trapezoidal elements 26. In order to achieve this result, the width ($w_1$) of the working surface 24 of the rectangular element 20 is made approximately equal to the width ($w_3$) of the working surface 38 of the trapezoidal element 26. Consequently, the two surfaces 24 and 38 sweep approximately the same area. As the saw blade penetrates the paving material 40 the sloping side surfaces 34 and 36 remove material in a lateral direction to form the side surfaces 48 and 50 of the groove 44. In this manner a trapezoidal shaped groove is formed in the paving material 40.

It is believed that by employing the intermediate rectangular shaped abrasive elements 20 in combination with the trapezoidal shaped elements that wear which would change the configuration of the trapezoidal shaped abrasive elements is retarded. Consequently, the abrasive saw blade produces an accepted trapezoidal groove for a longer period of time than conventionally shaped abrasive saw blades.

The foregoing invention has been described in illustrative manner, and is to be understood that the terminology which has been used is intended to be in the nature of words of description rather than limitation.

Obviously, many modifications and variations of the present invention are possible in light of the above teachings. It is therefore to be understood that the invention may be practiced otherwise and as specifically described herein and yet remain within the scope of the appended claims.

The embodiments of the invention in which an exclusive property or privilege is claimed are defined as follows:

1. A saw blade for producing a trapezoidal-shaped groove in a surface comprising: a circular support disc and a plurality of spaced-apart abrasive elements supported about the periphery of said support disc, said abrasive elements including a first set of a generally rectangular cross sectional configuration having a flat, work-engaging end surface of a predetermined width and a second set of a generally trapezoidal cross sectional configuration having a work-engaging end surface and sloping work-engaging side surfaces defining a maximum width greater than the width of said first set of abrasive elements.

2. A saw blade set forth in claim 1 wherein the width of said work-engaging end surface of said trapezoidal abrasive elements is approximately equal to the width of said work-engaging surface of said rectangular abrasive elements.

3. The saw blade set forth in claim 2 wherein the work-engaging end surfaces of all of the abrasive elements lie on a common radius of the support disc.

4. The saw blade set forth in claim 3 wherein said first and second sets of abrasive elements are distributed about the periphery of said support disc in repetitive order.

5. The saw blade set forth in claim 4 wherein said first and second sets of abrasive elements are distributed about the periphery of said support disc in alternating order.

6. The saw blade set forth in claim 5 wherein said abrasive elements are mounted on carriers attached to said support disc.

7. The saw blades set forth in claim 6 wherein said abrasive elements comprise a bonded mixture of diamond particles in a metal-base matrix.

8. A saw blade for producing a trapezoidal-shaped groove in a surface comprising: a circular support disc and a plurality of spaced-apart abrasive elements supported about the periphery of the support disc, said abrasive elements including a first set of a generally rectangular cross sectional configuration having a flat, work-engaging end surface of a predetermined width ($w_1$) and a second set of generally regular trapezoidal cross sectional configuration having a base of predetermined width ($w_2$), a work-engaging end surface of a predetermined width ($w_3$) which is smaller than the base width ($w_2$) and approximately equal to the width ($w_1$) of the work-engaging end surface of the rectangular abrasive elements.

9. The saw blade set forth in claim 8 wherein the work-engaging end surfaces of all of the abrasive elements lie on a common radius of the support disc.

10. The saw blade set forth in claim 9 wherein said first and second sets of abrasive elements are distributed about the periphery of said support disc in repitive order.

11. The saw blade set forth in claim 10 wherein said first and second sets of abrasive elements are distributed about the periphery of said support disc in alternating order.

12. The saw blade set forth in claim 11 wherein said abrasive elements are mounted on carriers attached to said support disc.

13. The saw blade set forth in claim 12 wherein said abrasive elements comprise a bonded mixture of diamond particles in a metal-base matrix.

* * * * *